July 2, 1957  R. M. TROSTLER  2,797,912
ACCELERATION-RESPONSIVE DEVICE
Filed Oct. 21, 1953
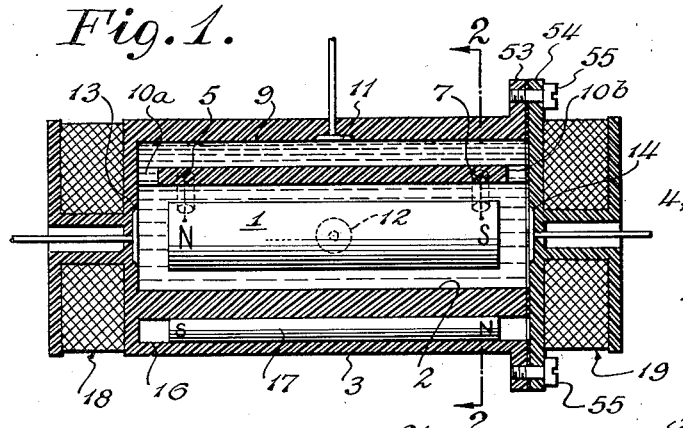
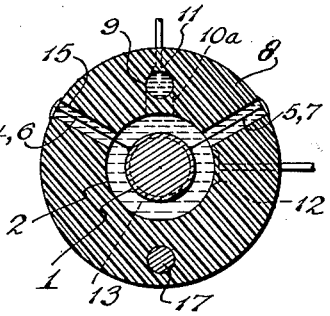
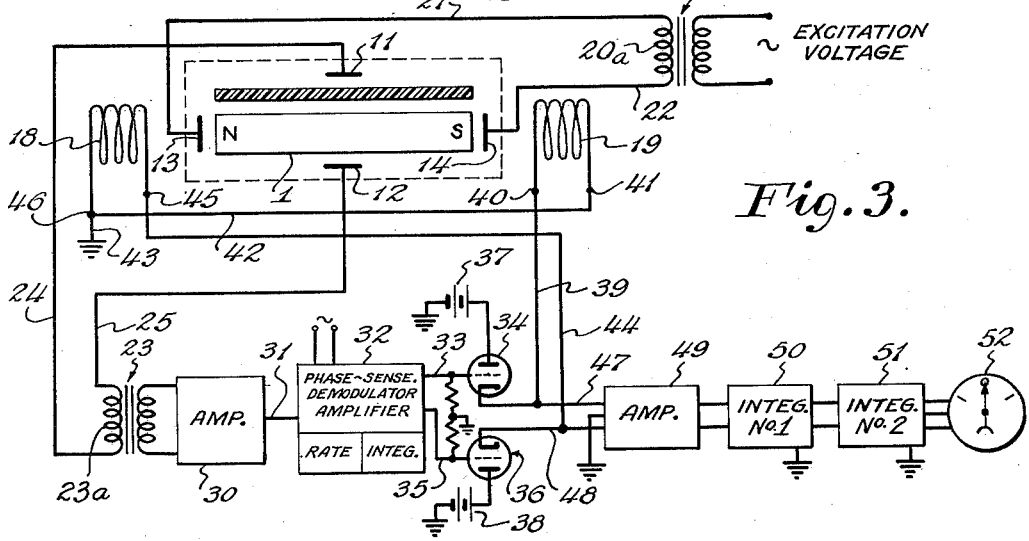
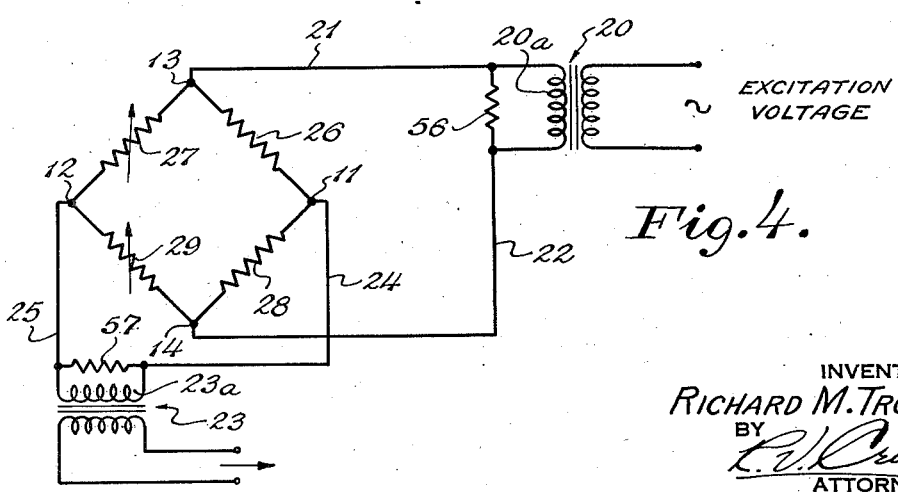
INVENTOR
RICHARD M. TROSTLER
BY
ATTORNEY

2,797,912

ACCELERATION-RESPONSIVE DEVICE

Richard M. Trostler, Pomona, Calif., assignor to Sperry Rand Corporation, a corporation of Delaware Application October 21, 1953, Serial No. 387,479

4 Claims. (Cl. 264—1)

This invention relates, generally, to the measurement of accelerations, and has reference more particularly to an improved accelerometer for measuring accelerations such as the acceleration of an aircraft.

The principal object of my invention is to provide an improved accelerometer apparatus having but a single sensitive axis and supplying an electrical signal output in accordance with components along said axis of accelerations imparted to the apparatus.

Another object is the provision of an accelerometer of the character described which is capable of supplying an acceleration signal output variable in a linear fashion over a wide range of accelerations.

Another object is to provide an accelerometer which fulfills the foregoing object and, in addition, is capable of being made small enough to be mounted directly on an aircraft-type gyroscope or the like.

Another object is the provision of novel means for rendering a movable inertia element highly sensitive to linear acceleration components in a given direction and substantially insensitive to such components in directions other than said given direction.

Another object is to provide a normally balanced resistance bridge formed of electrolytic resistance paths and an inertia element adapted to unbalance said bridge on movement of said element in response to acceleration such that when said bridge is excited from a suitable current source it provides an electrical signal output in proportion to said acceleration.

Other objects and advantages will become apparent from the specification, taken in connection with the accompanying drawings, wherein:

Fig. 1 is a side view, partly in section, of a preferred form of the accelerometer of this invention;

Fig. 2 is a sectional view taken in about the plane 2—2 of Fig. 1 and looking in the direction of the arrows;

Fig. 3 is a schematic diagram showing the accelerometer embodied in a system wherein an indication of the displacement of an object is derived from the accelerometer output; and Fig. 4 is a schematic diagram of a bridge circuit formed of electrolytic resistance paths in the accelerometer as employed in the arrangement of Fig. 3.

Figs. 1 through 3 are greatly enlarged showings of my accelerometer, and are approximately seven times the actual size of the instrument.

In Figs. 1 and 2, the inertia element of my accelerometer is illustrated, preferably, as a solid cylindrical member 1 which is centrally suspended in horizontal fashion within a longitudinally extending bore 2 in a casing 3 by means of two pairs of very fine fiber-like elements 4, 5 and 6, 7 respectively connected to and extending radially upwards from opposite ends of member 1 to connect with casing 3. Member 1 is preferably a permanent bar magnet for reasons hereianfter set forth, and is shown for illustrative purposes as having a north pole in the area where suspension elements 4, 5 are connected and a south pole in the region where suspension elements 6, 7 are connected.

Preferably, the angle formed between element 4 and element 5 in their common plane is substantially 120° and is bisected by the vertical diameter of member 1. A similar angular disposition preferably occurs between element 6 and element 7. By this arrangement and by appropriately spacing member 1 from the surrounding surface of bore 2, said member is freely suspended for substantially longitudinal movement axially of said bore, there being virtually no resistance offered to such movement by the suspension elements employed.

Any suitable means may be chosen to connect the suspension elements 4—7 to casing 3 and member 1; however, I have found, as far as the connections of said elements to the casing are concerned, that assembly of my accelerometer is facilitated somewhat by providing radially extending holes 15 in the casing, each of such holes running between bore 2 and the outer surface 8 of the casing and each adapted to accommodate one of the elements 4—7 such that the positioning of member 1 may be accomplished externally of the casing, and the ends of the elements may be readily affixed to the casing at its outer surface by some suitable means such as sealing wax.

In addition to being provided with the bore 2 as described, casing 3 is provided with another longitudinally extending bore 9 preferably of the same length and disposed in parallel relation to bore 2. The end of bore 9 corresponding to the north end of bore 2 is connected thereto by means of a lateral passage 10a in the casing. The other ends of said bores are connected by means of a similar passage 10b. An electrode 11 is mounted in the casing in a manner such that said electrode communicates with bore 9 intermediate the ends thereof and preferably midway therebetween. A substantially identical electrode 12 is mounted in the casing to communicate with bore 2 in a corresponding manner. At the end of bore 2 adjacent the north pole of member 1 and mounted in an end wall of the casing is still another electrode 13, and similarly mounted in the casing end wall at the other bore end adjacent the south pole of member 1 is yet another electrode 14 substantially identical to electrode 13.

Casing 3 is made of a material which is electrically non-conductive; and, on assembly, its bores 2, 9 and passages 10 are filled with a fluid electrolyte so as completely to immerse member 1 and provide conducting paths between each of the four electrodes through the electrolyte. Besides providing the interelectrode conducting paths just mentioned, the fluid electrolyte serves also as a damping medium for viscously damping movements of member 1.

Casing 3 may also contain a third longitudinally extending bore 16 preferably disposed in parallel relation to the bore 2 and containing intermediate its ends a fixedly-mounted bar-type permanent magnet 17 preferably of substantially the same length as member 1. Bore 16 is so spaced from bore 2 and magnet 17 is so mounted therein that its south pole cooperates with the north pole of member 1 and its north pole cooperates with the south pole of member 1. By this arrangement, the attraction of the two magnets aids in maintaining tension in suspension elements 4—7 and, together with said elements, substantially prevents any lateral or up and down movement of member 1 in bore 2.

In order to render my accelerometer useful over a very wide range of accelerations, I preferably provide means for balancing the forces exerted by axial components of acceleration on member 1, so that upon axial displacement of the member from a null position in response to such forces, said means acts immediately to restore the member substantially to null and to provide at the same time a measure of the disturbing acceleration. In this connection, I have shown in Fig. 1 an electromagnetic-field-producing means 18 at one end of casing 3 and cooperating with the north end of member 1, and a substantially identical means 19 at the other end of casing 3 and cooperating with the south end of member 1. Means 18, 19 are shown for illustrative purposes as two wire-wound spools coaxial with the longitudinal axis of member 1 and having their respective inboard sides formed of a different end wall of casing 3. For assembly purposes, I prefer to arrange the present instrument such that at least one of the end walls, and, therefore, at least one of the spools is removable to furnish access to the interior of the instrument. In this regard, I have shown in Fig. 1 a peripheral flange portion 53, for example, forming part of casing 3. The inboard side 54 of spool 19 is of substantially the same diameter as flange 53 and both members are suitably drilled and securely fastened together with screws 55 or the like such that the access end of casing 3 is given a fluid-tight seal when assembled. As will hereinafter more fully be described in connection with Figs. 3 and 4, means 18, 19 are preferably arranged so that when energized they apply a net force of repulsion to member 1 in a direction to restore the same to its null position.

Within the scope of my invention the accelerometer thus far described may be connected in at least two principal ways to provide an output signal in accordance with acceleration components along its sensitive axis. In Fig. 3, for example, I have shown one such mode of connection wherein a suitable source of alternating excitation voltage, which may include a transformer 20 having a secondary winding 20a, is connected via secondary leads 21 and 22 across electrodes 13 and 14. By connecting the remaining two electrodes 11 and 12 across the primary winding 23a of another transformer 23, as by leads 24 and 25 respectively, it will become apparent that the secondary winding of said other transformer will provide an alternating voltage having a phase depending on the direction in which member 1 moves and having an amplitude depending on the distance moved. This comes about by virtue of the unbalancing of a resistance bridge formed by the recited connections of the several electrodes and the electrolytic resistance paths produced between the electrodes as hereinbelow described.

The resistance bridge created by the arrangement depicted in Fig. 3 is schematically shown in Fig. 4 wherein arm 26 represents a fixed resistance formed in the electrolyte between electrodes 11 and 13 by way of passage 10a and half of bore 9, and arm 27 represents a variable resistance formed between electrodes 13 and 12 via the electrolyte and the north polarity half of member 1. By the same token, arm 28 represents a fixed resistance formed in the electrolyte between electrodes 11 and 14 by way of passage 10b and the other half of bore 9, and arm 29 represents a variable resistance formed between electrodes 14 and 12 via the electrolyte and the south polarity half of member 1. Each of the electrodes constitutes a connection between a different pair of resistances 26—29; hence, a resistance bridge is formed with each of said electrodes serving as a terminal thereof. The connection of secondary winding 20a of transformer 20 across electrodes 13 and 14, therefore, serves to excite the bridge, while the connection of primary winding 23a of transformer 23 across electrodes 11 and 12 serves to provide a load for the bridge. And in order to represent the fixed resistance paths between electrodes 13 and 14 and electrodes 11 and 12 via the electrolyte and inertia member 1, I have provided, respectively, a resistor 56 connected in parallel with excitation winding 20a and a resistor 57 connected in parallel with load winding 23a.

Care is exercised at assembly to insure that the fixed resistance of arm 26 substantially equals the fixed resistance of arm 28 and that at zero acceleration, i. e., when member 1 is centrally located between electrodes 13 and 14, the resistance of arm 27 substantially equals the resistance of arm 29. By this arrangement, the bridge is balanced at zero acceleration and no current will flow through the primary winding of transformer 23. On the other hand, when member 1 is caused to depart from its normal position midway between electrodes 13 and 14, as it does in response to an axial component of acceleration imparted to the instrument, the bridge is unbalanced and alternating current flows through the primary winding 23a of transformer 23. This is due to the fact that one of the variable resistances 27, 29 is thereby increased while the other is decreased. That is to say, if an acceleration is imparted to the instrument from left to right, as viewed in Fig. 1, for example, member 1 responds by moving to the left such that the electrolytic resistance path between electrode 13 and the north end of member 1 is less than the electrolytic resistance path between electrode 14 and the south end of member 1. In this fashion, the balanced condition of the bridge is disturbed and alternating current consequently flows through the load winding 23a. It will be apparent to those skilled in the art that a 180° phase reversal of this alternating current occurs when member 1 is caused to move from its normally central position in the other direction for oppositely affecting said electrolytic resistance paths. And, in either event, the amplitude of the alternating current in transformer 23 is proportional to the distance through which member 1 is moved, which, of course, is proportional to the amount of acceleration causing such movement.

While the balanced bridge arrangement thus far described is such that the bridge is excited across terminals 13 and 14 to produce a signal proportional to acceleration across terminals 11 and 12 upon displacement of the inertia member, it will be noted that the same displacement signal would appear across terminals 13 and 14 if the bridge were, instead, excited across terminals 11 and 12.

The secondary of transformer 23 may be connected to supply the alternating current output of my accelerometer to a conventional phase meter suitably calibrated to provide a visual indication of the magnitude and direction of the acceleration giving rise to such output. Preferably, however, as shown in the embodiment of Fig. 3, I employ an arrangement responsive to said A.-C. output for greatly enlarging the range of accelerations to which the instrument is linearly sensitive and at the same time providing a visual indication of the distance traveled in the direction of the sensitive axis of the accelerometer by an object, such as an aircraft, in which the accelerometer is mounted.

In this regard, therefore, I have connected the secondary of transformer 23 to the input of a conventional amplifier 30, and I feed the amplified signal via a lead 31 to a phase-sensitive demodulator-amplifier 32. Demodulator-amplifier 32 is adapted through conventional means to provide a composite D.-C. signal output proportional to its A.-C. signal input, the rate of change of said input, and the integral of said input.

The output of demodulator-amplifier 32 is connected via leads 33, 35 across the grids of substantially identical triodes 34, 36 which are connected as cathode followers to function as a stage of power amplification. The plate of triode 34 is connected to the positive side of a battery 37 having its negative side connected to ground, and the plate of triode 36 is connected to the positive side of battery 38 having its negative side connected to ground. The cathode of triode 34 is connected via a lead 39 to a terminal 40 of the electromagnetic-field-producing winding 19 which has its other terminal 41 connected via leads 42, 43 to ground. In an analogous fashion, the cathode of triode 36 is connected via a lead 44 to a terminal 45 of the oppositely-disposed winding 18 which has its other terminal 46 connected via lead 43 to ground.

For the phase of accelerometer signal corresponding to movement of member 1 to the right, demodulator 32 produces a positive potential, for example, on the grid of triode 34 and at the same time produces a negative potential on the grid of triode 36; and for the other phase of accelerometer signal output, the grid potentials are reversed. Hence, only one triode at a time conducts depending on the direction in which an acceleration is imparted along the sensitive axis of the instrument. By this arrangement, winding 19, alone of the two windings 18, 19, is energized when triode 34 conducts—as is winding 18 when triode 36 conducts. The turns of winding 19 are preferably wound in a sense such that, on being energized, winding 19 produces a south magnetic pole adjacent the south pole of member 1, and the turns of winding 18 are wound for producing a north pole adjacent the north pole of member 1. In operation, therefore, as soon as member 1 is caused to move from its null position, it is magnetically repelled by a force produced by one or the other of windings 18, 19 acting in a direction to restore the member to said null position.

The rate portion of the output of demodulator-amplifier 32 produces a damping effect on member 1 similar to that produced by the viscosity of the electrolyte and it, moreover, permits the displacement gain to be greatly increased over what it otherwise would be limited to without causing the system to lose its stability and become oscillatory. Hence, the response of the system is considerably enhanced by virtue of using this rate term. And without the integral term in the output of demodulator-amplifier 32, the sensitive member could not be fully restored to its null position while undergoing acceleration, since to do so would reduce the output signal to zero and consequently remove all of the restoring force so that member 1 would again depart from null. As a matter of fact, member 1 would move just far enough to produce a signal and, hence, a restoring force just large enough to counterbalance the force produced by the applied acceleration. However, with the integral term in the output of demodulator-amplifier 32, member 1 will actually be driven back to null for any sustained acceleration within the operational range of the system. By sustained acceleration, I mean an acceleration that lasts long enough to give the integral time to act, preferably some fraction of a second.

With the current flowing in one or the other of windings 18 and 19, a D.-C. signal potential will exist across cathode leads 39, 44 having a polarity dependent on the direction of the acceleration present. So long as the magnetic field produced by the windings is sufficiently strong to produce a force which counterbalances the acceleration force exerted on member 1, thereby to return said member substantially to null, the aforesaid D.-C. signal will vary linearly in magnitude in accordance with the magnitude of the acceleration. Hence, the upper limit of the linear range of sensitivity of the instrument is a function of the maximum strength of the electromagnetic field produced, and theoretically can be made to approach infinity by employing magnet windings of large current-carrying capacity and a signal amplifier capable of providing the necessary winding current without undue distortion of the signal.

In most applications for an instrument of the character described, it is deemed exceedingly satisfactory to be able to obtain a linearity of signal output over an acceleration range of the order of .001 to 2 times the acceleration of gravity. This I have been able to accomplish with the present accelerometer while at the same time keeping the instrument's size diminutive enough so that, for stabilization of its sensitive axis, it is readily mountable on an aircraft-type gyroscope.

In order to provide an indication of the distance traveled by the object carrying the accelerometer, I provide means as shown in Fig. 3 for successively integrating the D.-C. acceleration signal output appearing across leads 47, 48. Thus, I have shown leads 47, 48 connected in input fashion to a suitable amplifier 49 for amplifying the signal before it is fed to a first integrator 50 of conventional design, thence to a second integrator 51 like the first. The output of integrator 51 is a direct current proportional to the second integral of the acceleration signal, and, therefore, represents distance traveled. A visual indication of distance may be obtained, as shown, by feeding the output of integrator 51 to an indicating device such as a zero-center D.-C. meter 52 suitably calibrated to read in units of distance.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an acceleration-responsive device, the combination comprising a casing having a bore therein and a passage connecting a first end of said bore with a second end thereof, said bore and said passage being filled with a fluid electrolyte, an electrically conductive inertia member having a longitudinal axis, means for suspending said inertia member for movement substantially along said axis in said bore and electrolyte, said inertia member having one of its ends normally spaced a given amount from the first end of the bore and its other end normally spaced a like amount from the second end of said bore, a first electrode fixedly mounted in said passage to communicate with the electrolyte therein, a second electrode fixedly mounted in said bore to communicate with the electrolyte therein, each of said first and second electrodes being disposed midway between the ends of said bore and together forming a first pair of electrodes, a second pair of electrodes respectively fixedly mounted at the ends of said bore to communicate with the electrolyte thereat, and a source of excitation voltage connected across one of said pairs of electrodes, whereby a signal potential is developed across the other of said pairs of electrodes dependent upon the axial displacement of the inertia member from its normal position.

2. The acceleration-responsive device of claim 1 further including electromagnetic means responsive to the displacement signal potential for restoring the inertia member to its normal position.

3. In a device of the character described, mounting means, an inertia element comprising a first bar magnet, suspension means connected to said first magnet for freely suspending the same from said mounting means for horizontal movement in a lengthwise direction, said suspension means being arranged substantially to prevent both lateral movement of said first magnet and movement thereof in a downward direction, and a second bar magnet fixedly mounted in said mounting means, said second magnet being of substantially the same length as said first magnet and spaced in parallel lengthwise fashion directly below said first magnet so that opposite poles of said magnets cooperate one with the other to resist movement of said first magnet in an upward direction, whereby said first magnet is rendered substantially insensitive to accelerations other than those which have at least a component in said lengthwise direction.

4. An acceleration-responsive device comprising a casing having a bore therein and a passage connecting one end of said bore with the other end thereof, an inertia member, means for supporting said inertia member to move substantially longitudinally of said bore from a normally central position therein, said inertia member being electrically conductive and immersed in a fluid electrolyte substantially filling said bore and passage, and pick-off means for providing a signal in accordance with said longitudinal movement, said pick-off means comprising a first pair of electrodes communicating with said electrolyte and respectively mounted adjacent the ends of said bore, a third electrode communicating with said electrolyte and mounted in said passage such that fixed and substantially equal electrical impedance paths are formed in the electrolyte between said third electrode and each of said first pair of electrodes, a fourth electrode communicating with said electrolyte and mounted in said bore intermediate the ends thereof such that normally substantially equal electrical impedance paths are formed between said fourth electrode and each of said first pair of electrodes via the electrolyte and the inertia member, said third and fourth electrodes together forming a second pair of electrodes, and a source of electrical potential connected across one of said pairs of electrodes, whereby on acceleration of said device in a direction longitudinally of said bore, said inertia member is caused to move from its said central position for providing a difference in potential between the other of said pairs of electrodes in accordance with said acceleration.

References Cited in the file of this patent

UNITED STATES PATENTS

| | | |
|---|---|---|
| 2,067,467 | Urfer | Jan. 12, 1937 |
| 2,591,921 | Cosgriff | Apr. 8, 1952 |
| 2,677,270 | Sanderson | May 4, 1954 |